INVENTOR.
Arch C. Luther, Jr.
BY
ATTORNEY

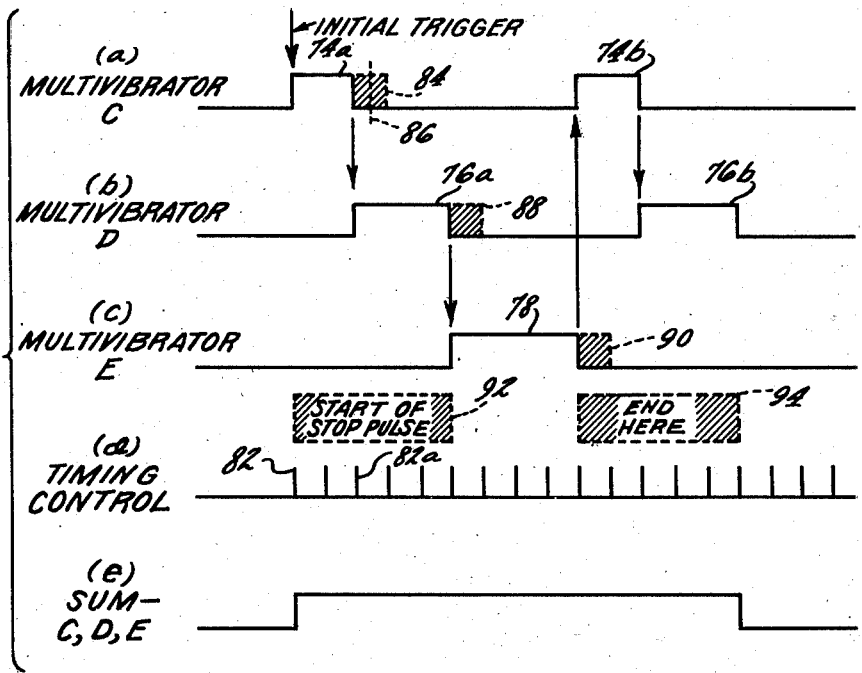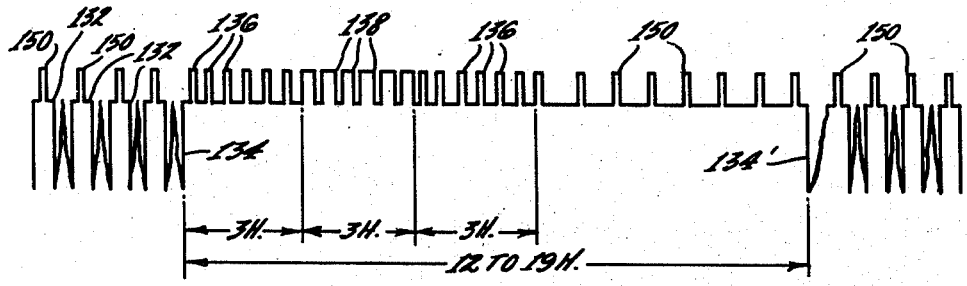

INVENTOR.
Arch C. Luther, Jr.
BY
ATTORNEY

United States Patent Office 2,835,804
Patented May 20, 1958

2,835,804

WAVE GENERATING SYSTEMS

Arch C. Luther, Jr., Merchantville, N. J., assignor to Radio Corporation of America, a corporation of Delaware Application November 16, 1953, Serial No. 392,391

12 Claims. (Cl. 250—27)

The present invention relates to improvements in wave generating systems particularly, although not necessarily exclusively, to wave generating systems of the multivibrator type.

More directly, the present invention relates to wave generating systems suitable for application in timing control systems wherein a given interval of time is to be accurately divided into periods of predetermined duration, or wherein a given control signal is to initiate the development of a plurality of pulse waveforms of predetermined and possibly different durations all related in timing to the recurrence period of the control signal.

It is frequently desirable in electronic circuits involving the development of complex waveforms to provide means for accurately forming and determining the duration and frequency of pulse waveforms comprising a pulse chain, which pulse chain has been triggered or inaugurated by a timing pulse. For example, it is sometimes desirable in specialized radar systems to sensitize the receiver section of the radar system only during predetermined periods following the initial transmission of a radar pulse. This permits the selective display of radar position information only in relation to certain positions falling in predetermined areas of range from the transmission point. For this purpose, it is expedient that the transmitted radar pulse inaugurate a chain of control pulses for the radio receiving means, which will enable or sensitize the receiver only during the periods of the individual pulses. In this way extraneous responses on the radar display screen corresponding to positions outside of the ranges of interest may be prevented.

Another application in the electronic art demanding extreme accuracy in defining the duration and frequency of the elements comprising a pulse chain is found in connection with the development of television broadcast synchronizing signal waveforms. For example, it is well known that in the R. T. M. A. standard monochrome television synchronizing signal waveform, the vertical synchronizing signal period includes a rather well defined period of approximately nine horizontal lines duration, in which there is transmitted separate groups of double line frequency equalizing and vertical serration pulses. These groups of pulses are each approximately three horizontal lines in duration and include in each three horizontal line duration period six pulses of the type required to define the equalizing or serration periods. For this purpose, it has been found convenient to develop during the period immediately following the inauguration of the vertical blanking signal three control pulse signal waveforms each corresponding to approximately three horizontal line intervals. These control pulses are then employed to control the generation of the respective equalizing and serration waveforms. In order to insure stability in the received television picture, the accuracy with which the equalizing and vertical serration periods are defined must be held within very close tolerances.

One of the more conventional ways of generating a chain of signal pulses is to connect in cascade relation a plurality of multivibrator circuits of the monostable type. Under such conditions triggering of the first multivibrator will set off a chain reaction in which each multivibrator is successively triggered by the preceding multivibrator. The accuracy of the pulse width so produced and the timing between adjacent pulses will, of course, depend upon the stability of the multivibrator circuits. Aging of circuit parameters making up the multivibrator stages may require constant adjustment of the circuit operation to maintain operation within predetermined standards. Moreover, in prior art systems of the type just described, it is conventional that a separate multivibrator stage be provided for each pulse to be generated. Thus, the number of multivibrator circuits required would in the prior art have to correspond exactly to the number of pulses comprising the desired pulse train. Where pulse trains comprising many pulses are to be generated, the provision of a corresponding number of multivibrators may be quite costly and difficult to maintain in a stabilized operating condition.

It is, therefore, an object of the present invention to provide an improved electrical waveform signal generating system capable of producing pulse trains whose elements are of a predetermined duration and whose waveforms fall within close electrical and timing tolerances.

It is yet another purpose of the present invention to provide an improved multivibrator pulse generating circuit of the chain type in which the pulses defined by the multivibrator chain are to a large extent independent of small variations in the characteristics of each multivibrator.

It is another object of the present invention to provide an improved multivibrator chain for producing pulse trains in which the number of multivibrators required is less than the total number of pulses comprising each pulse train.

In the realization of the above objects and features of advantage, it is contemplated in the practice of the present invention to provide a plurality of multivibrator circuits, preferably of the monostable type connected in closed series loop or chain relation with one another in a manner tending to maintain perpetual triggering and recycling of the multivibrators. Means are then provided for normally maintaining at least one of the multivibrator circuits in a desensitized or disabled condition whereby to overcome the recycling of the multivibrator chain. The present invention provides means for then overcoming on a controlled basis the effect of the disabling means for a predetermined period following the application of a triggering pulse to one or more of the monostable multivibrator circuits included in the chain.

The present invention also includes the provision of a timing control signal source whose period is integrally related to the period of all pulses generated by the multivibrator chain and to the period of triggering the multivibrator chain. This signal is then simultaneously applied to all multivibrator stages to supplement triggering voltages applied thereto. This insures "turn-off" of each stage at a time to a degree independent of the natural period of the individual multivibrator stage.

A more complete understanding of the operation of the present invention as well as an appreciation of other objects and features of advantage thereof will be obtained through a reading of the following specification, especially when taken in connection with the accompanying drawings, in which:

Figure 3 is a graphical representation of certain waveforms encountered in the embodiment of the present invention shown in Figure 2.

Figure 5 is a graphical representation of an R. T. M. A. type television broadcast signal produced by the embodiment of the present invention shown in Figure 4.

Figure 1:
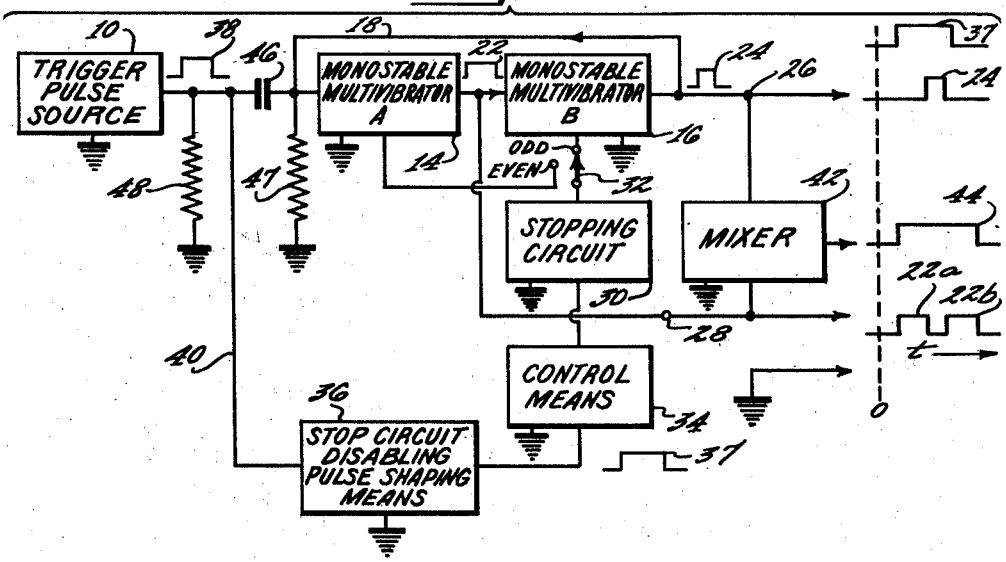
Figure 1 is a combination block and schematic representation of a basic form of the present invention.

Turning now to Figure 1, there is illustrated in block form at 10 a source of triggering pulses of a waveform suitable for triggering a monostable multivibrator circuit. A first and a second monostable multivibrator circuit are shown respectively at 14 and 16. As is well known in the art, monostable multivibrators may take a variety of forms. In general, a monostable multivibrator comprises a first and a second amplifying means connected in a loop relation with one another with their input and output circuits phased in a regenerative sense. Time constant means are then interposed between the first and second amplifying means. That amplifying means whose output circuit is connected with the time constant circuit is generally referred to as the charging amplifying means, while the other amplifying means, having its input circuit connected with the time constant circuit, is generally referred to as the charge responsive amplifying means. The bias means are then provided for rendering the charge responsive amplifying means normally conductive and the charging amplifying means normally non-conducting. Trigger pulses may then be applied to the normally conducting charge responsive amplifying means of the multivibrator circuit. The triggering pulses are effectively amplified and caused to render the charging amplifying means sufficiently conductive to charge the time constant means to an extent causing cut off of the charge responsive amplifying means. Upon decay of the charge in the time constant circuit, the charge responsive amplifying means again becomes conductive thereby defining the end of the multivibrator cycle.

Such multivibrators are shown in a publication by Donald G. Fink, "Principles of Television Engineering," page 403, published in 1940. Such multivibrators are further discussed in an article entitled "Multivibrators" by T. Gootee, appearing in the "Radio News" for February and March 1947. As will be seen hereinafter, the present invention is in no way limited by the particular form of multivibrator circuit used.

Figure 4:
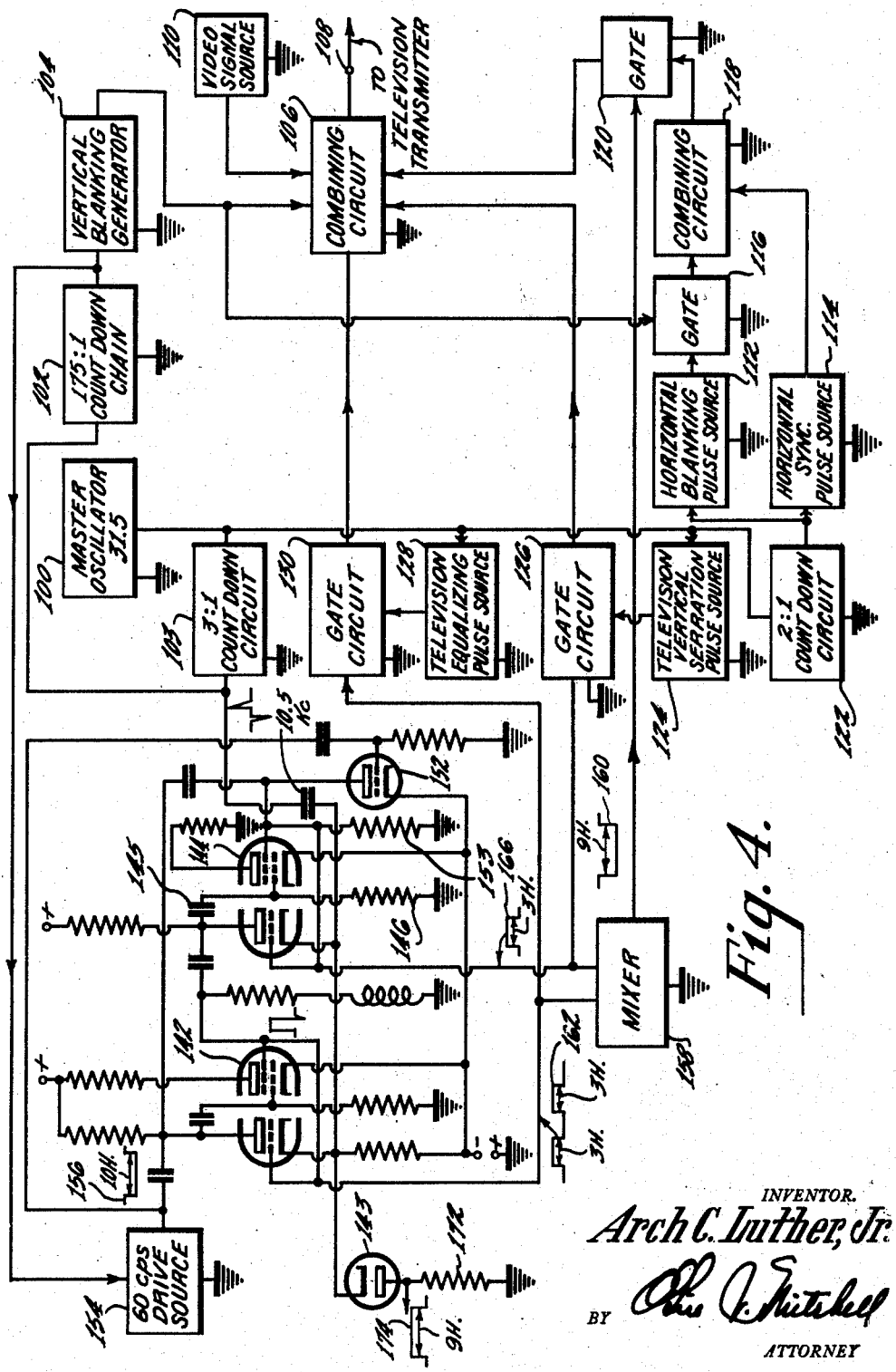
Figure 4 is a combination block and schematic representation of a television waveform generating system embodying the novel features of the present invention.

Further examining the arrangement shown in Figure 1, it is observed that the output signal from the multivibrator 16 is applied by a circuit path 18 to the input terminal of multivibrator circuit 14. For purposes of convenience, the multivibrators 14 and 16 have been respectively designated as "A" and "B." With this basic arrangement of the triggering pulse source 10 and the multivibrators A and B connected in loop relationship with one another, it will be seen that once the monostable multivibrator is triggered by a single triggering pulse from the source 10, the multivibrators A and B will continue the development of a chain of pulses. The output signal waveform 22 from multivibrator A will trigger multivibrator B. The output waveform 24 from multivibrator B will in turn trigger the multivibrator A which will, in turn, produce its output waveform 22, etc. Output signal from the multivibrator chain may be derived either from the output terminal of the multivibrator B, indicated at 26, or the output terminal of multivibrator A, indicated at 28. Purely by way of example, the timing interval of multivibrator A has been indicated as being longer than the timing interval of multivibrator B. This is evidenced by the longer duration of the output waveform 22 over the output waveform 24. In accordance with the present invention, however, a stopping circuit 30 is conditionally applied to either the multivibrator A or the multivibrator B by means of switch means 32. Control means 34 are provided for conditionally disabling the stopping circuit 30 in accordance with a stop circuit disabling pulse derived from a stop circuit disabling pulse shaping means 36. The stopping circuit 30 and its control means 34 may take a variety of forms. The purpose of the stopping circuit 30 is to maintain the multivibrator circuit with which it is conditionally connected, in a disabled or stopped condition by withholding operating voltage from the multivibrator circuit, shunting or disabling one or both of its amplifying means, shunting the multivibrator time constant circuit, etc. One particular form of stopping circuit is shown in Figure 4, hereinafter to be described.

In accordance with the present invention, the stop circuit disabling pulse shaping means 36 may also be a delay line. On the other hand, the stop circuit disabling pulse shaping means 36 may be active in nature, such as comprising another multivibrator circuit of the monostable variety.

In the operation of the invention shown in Figure 1, assuming the stopping circuit 30 is connected with monostable multivibrator circuit 16 through switch 32, it will be apparent that the repeated application of triggering pulses to the multivibrator system will produce output pulses only at output terminal 28, corresponding to the triggering of monostable multivibrator A. If, however, in accordance with the present invention, the triggering pulse 38 is applied to the stop circuit disabling pulse shaping means 36 via circuit path 40 (the stop circuit disabling pulse 37 delivered by the stop circuit disabling pulse shaping means 36 may be merely a widened version of the triggering pulse 38 as would be provided, for example, by multivibrator action), the control means 34 may be arranged to disable the stopping circuit 30 upon the initiation of the triggering pulse 38. If the stop circuit disabling pulse 37 is longer in duration than the timing interval (or pulse width) of multivibrator A, the effect of the stopping circuit 30 will be momentarily removed from the multivibrator B, so that it may respond to the output pulse 22 from the multivibrator A. If, however, the pulse waveform delivered by the stop circuit disabling pulse shaping means 36 is such that the effect of the control means 34 to disable the stopping circuit 30 is removed at a time subsequent to the cycling of multivibrator B, but before the second cycling of multivibrator A, it will be apparent that a pulse train of three pulses will be developed by the multivibrator system. These three pulses in the sequence in which they are developed, are illustrated at 22a and 24 and 22b.

On the other hand, should the stop circuit disabling pulse shaping means produce a stop circuit disabling pulse 37, whose front edge occurs any time during the first timing interval of multivibrator A (that is any time during the pulse 22a) but of sufficient width that its trailing edge occurred at a time subsequent to the second cycling of multivibrator B (that is after the pulse 22b), it is evident that the multivibrator system will produce a series of five output pulses. Thus, with the stopping circuit 30 connected with the multivibrator B, the number of pulses generated by the multivibrator system in response to a single triggering pulse will always be odd.

In further accordance with the present invention, the stopping circuit 30 may be applied to the multivibrator A by means of switch 32. Under these conditions, it is apparent that the stop circuit disabling pulse shaping means 36 must immediately disable the stopping circuit 30 in response to the triggering pulse 38, in order for the multivibrator A to be triggered by the triggering pulse. However, if the stop circuit disabling pulse 37 is made of a duration longer than the timing interval of multivibrator A but shorter than the sum of the timing intervals of multivibrators A and B, the monostable multivibrator circuit will cycle twice, producing but two output pulses. By causing the stop circuit disabling pulse 37 to have a width greater than the sum of the timing intervals of multivibrators A and B plus the timing interval of a timing control signal produced by the timing control signal generator 80 shown in Figure 2. The timing control signal delivered by the generator 80 is simultaneously applied to the multivibrators C, D and E. Regardless of the particular form of the multivibrators C, D and E, the timing control signal is applied to the respective multivibrator circuits in such a fashion as to aid in re-establishing conduction in the charge responsive amplifying portion of each multivibrator circuit thereof.

Figure 2:
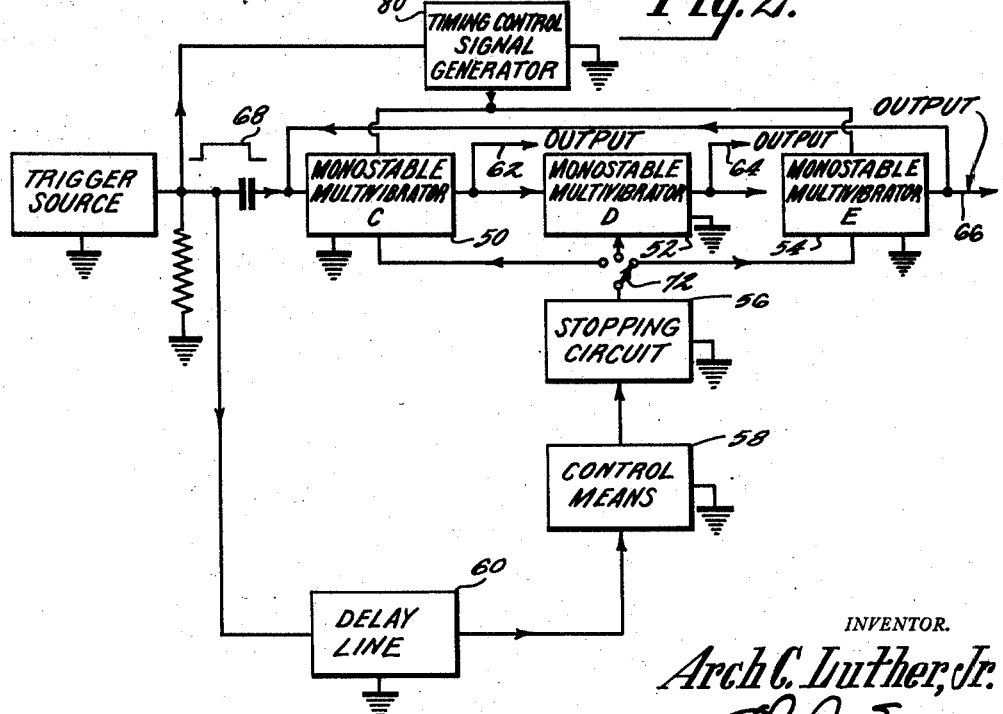
Figure 2 is a block diagram representation of another form of the present invention.

The effect of the timing control signal in the arrangement of Figure 2 can most effectively be seen by studying the waveforms shown in Figures 3a, 3b, 3c and 3d. The timing control signal itself is illustrated by way of example, at 82 and is shown in relation to the beginning and ending of each of the pulses 74a, 76a, 78, 74b and 76b. It will be noticed that the period of the timing control signal 82 is integrally related to the period of each of the generated pulses 74a, 76a, 78, 74b and 76b, and that in accordance with the present invention, there exists an integral relation between the rate at which the multivibrator system as a whole is triggered and the frequency of the control pulses 82. Control pulses 82 may be thought of as "turn-off" pulses for each of the monostable multivibrators, inasmuch as they act upon, as described above, the charge responsive section of each multivibrator to aid in its conduction and consequent defining of the end of the respective multivibrator period.

It is, therefore, seen with reference to Figure 3a, that the natural period of the multivibrator C need not be held to extremely close tolerances in order that the pulse 74a be defined with considerable accuracy. By way of example, the dotted area 84, shown in connection with pulse 74a, indicates the possible extent of the natural period of the multivibrator C with the trailing edge of pulse 74a yet remaining well defined as a result of pulse 82a of the timing control pulses in Figure 3d. It is generally desirable, therefore, that the natural period of the multivibrator C fall at some intermediate point such as indicated by the dotted line 86 so that variations in tube characteristics and operating voltage will still maintain multivibrator operation under the control of the timing pulses 82. Similar tolerances for the multivibrators D and E are indicated by the shaded areas 88 and 90 respectively. The shaded areas 92 and 94 immediately under the waveform 78, shown in Figure 3c, illustrate possible limits of time interval in which the stopping circuit disabling pulse may begin and end to accomplish the described generation of five pulses in response to each triggering pulse as described above.

To produce a train of five pulses in response to a trigger pulse, multivibrator E must be rendered operative through the disabling of the stopping circuit 56 at a time prior to the trailing edge of the pulse 76a delivered by the multivibrator E. Thus, the multivibrator E may be enabled or made active for the entire period between the initial triggering pulse and the end of pulse 76a if desired. The multivibrator E must, however, be disabled again through the enabling of the stopping circuit 56 at a time prior to the termination of the second pulse 76b delivered by the multivibrator D. Under these conditions, the multivibrator system will cycle but five times in response to a single triggering pulse. Should the multivibrator E be maintained in an operating condition for a time beyond the termination of the pulse 76b, the generation of eight pulses would follow the triggering of the multivibrator system provided the multivibrator E was disabled before the end of the third output pulse from multivibrator D.

As pointed out hereinabove, the novel features of the present invention find ready application in television waveform generating systems. For example, there is shown in Figure 4 a basic type of television waveform generating system comprising a master oscillator 100, a 525:1 countdown means comprising counter 102 and 103 and a vertical blanking generator 104 connected in a conventional manner to provide vertical blanking signals to a signal combining circuit 106, which is in turn applied to a television signal transmission channel having a terminal at 108. A video signal source 110 is also coupled with the combining circuit 106 for mixing video signals with transmitted vertical blanking signals. The video signal source is generally synchronized in its operation from the master oscillator 100 by well known means, not shown.

Horizontal blanking and horizontal sync pulse waveform generators are respectively shown at 112 and 114. Signals from the horizontal blanking and horizontal sync pulse sources are eventually conveyed to the combining circuit 106 through gate circuit 116 combining circuit 118 and gate circuit 120. The horizontal blanking and horizontal sync pulse sources are, of course, timed by a 2:1 countdown provided by the countdown circuit 122 from the master oscillator 100.

The vertical serration portion of the vertical sync pulse is generated by the generator 124 which is in turn coupled with the combining circuit 106 through the gate circuit 126. Vertical equalizing pulses are similarly provided from a pulse generator 128 whose output signal is combined with the combining circuit 106 through a gate circuit 130.

From the description of Figure 4 thus far provided, it will be apparent that a television waveform of the character shown in Figure 5 may be quite easily generated by merely controlling the opening and closing of the gate circuits 116, 120, 126 and 130. Here the horizontal blanking pulses are indicated by section 132 of the television waveform. Vertical blanking signal as defined by the waveform front edge 134 and trailing edge 134' exists for a duration of 12 to 19 horizontal line intervals. The vertical equalizing pulses are twice the horizontal line repetition frequency and are indicated at 136. The equalizing pulses appear in two pulse trains, one train situated immediately before the vertical serration period and the other train following the vertical serration period. Horizontal synchronizing pulses such as 150 continue within the blanking period (12 to 19 H.) as provided in the R. T. M. A. television standards.

For the purposes of the arrangement of Figure 4, one of the more direct approaches of obtaining the pulse waveform shown in Figure 5 is to divide the first 9H. period of the vertical blanking signal into three 3H. periods. This causes the first train of equalizing pulses 136 to be substantially three horizontal line periods in duration as well as the later equalizing pulse train following the vertical serration period.

It, therefore, becomes necessary only to provide the gate circuits 116, 120, 126 and 130 with appropriate control signals in order to permit their output signals to be properly mixed in the combining means 106 for broadcast transmission. Thus, for the first 3H. period of the vertical synchronizing pulse shown in Figure 5 it will be necessary, in accordance with the particular arrangement shown in Figure 4, to render the gate circuit 130 open to pass equalizing pulses during the first 3H. period. The gate circuits 116, 126 and 130 will then be respectively opened at times corresponding to the first, second and third 3H. periods of the vertical synchronizing pulse waveform.

It is, therefore, seen that the gate circuits 120, 126 and 130 should be successively activated by well defined timing signals. In accordance with the present invention, the means for providing the necessary control signals comprises a basic monostable multivibrator chain of the nature discussed in Figures 1 and 2. The double envelope tube 142 and double envelope tube 144 correspond to the separate multivibrator circuits 14 and 16 shown in Figure 1 with the exception of the stabilizing diode 143. The basic multivibrator circuits shown in Figure 4 need no explanation as to details of their operating mode. As taught in copending U. S. patent applications Serial No. 343,623, filed March 20, 1953, and Serial No. 389,- of multivibrator A, it will be apparent that the multivibrator system will produce four output pulses. Thus, with the stopping circuit 30 connected with the multivibrator A, the multivibrator system will produce an even number of output pulses in response to a single triggering pulse.

Also shown in the embodiment of Figure 1 is a mixing circuit 42, which is provided for combining the output signals 22 and 24 whereby to define output signal 44 whose duration represents the interval of time following the initial triggering of the multivibrator system in which generation of output signal waveforms at terminal 26 and 28 continues.

In further accordance with the present invention, it is noted that means must be provided for preventing the output signal 24 from the multivibrator B from being sensed by the stop circuit disabling pulse shaping means 36 as a triggering pulse. This, of course, is to prevent continuous recycling of the multivibrator system in response to but a single triggering pulse. Various means may be provided for isolating the output circuit of multivibrator B from the stop circuit disabling pulse shaping means 36. For example, the triggering pulse 38 may be coupled to the multivibrator circuit A through a capacitor 46. If the resistor 47 connected from the input terminal of multivibrator A to ground is valued sufficiently low in comparison with the value of capacitor 46, the triggering pulse 38 will be effectively differentiated in its application to multivibrator A. If, however, the source impedance of the trigger pulse source 10, represented for example, by the resistor 48 is sufficiently small, the output signal 24 from the multivibrator B will be severely attenuated due to the reactance drop across capacitor 46. Thus, the stop circuit disabling pulse shaping means 36 will be responsive only to triggering pulse source 38, while the multivibrator circuit A will be responsive to both triggering pulses 38 and output signals from the multivibrator B. This latter statement as to the responsiveness of the multivibrator A assumes, of course, the absence of disabling influence by the stopping circuit 30.

From the above, it can be seen that by properly shaping and controlling the duration and timing of the stop circuit disabling pulse 37 and by the proper selection of the multivibrator to be disabled via switch 32, the multivibrator system may be made to produce any number of pulses, odd or even, in response to a single triggering pulse.

Regardless of the number of pulses the multivibrator system of Figure 1 is caused to produce, in response to a single triggering pulse, it is apparent that only three distinct waveforms are available from the circuit as a whole. Thus, a first signal responsive means could be connected with the output terminal 26, a second responsive means could be connected with the output terminal 28 and a third signal responsive means could be connected with the output circuit of the mixer 42.

If, however, it is desired to separately control a greater number of signal responsive circuits by the individual pulses, developed by a multivibrator system, operated in accordance with the present invention, an additional monostable multivibrator circuit may be used for each additional signal output terminal desired. For example, in Figure 2 there are provided three monostable multivibrator circuits, "C," "D" and "E," respectively. These multivibrators have also been numerically designated as 50, 52 and 54, respectively. As in the arrangement of Figure 1, the monostable multivibrator circuits C, D and E are connected in a closed loop relation to one another with a stopping circuit 56, arranged for conditional application to any one of the multivibrator circuits. A control means 58 for the stopping circuit 56 is illustrated as being responsive to the output signal from a delay line 60. The delay line 60 has been shown merely as a specific example of one form of stop pulse shaping means such as 36, in Figure 1. Output signals from the multivibrator system of Figure 2 may be taken from the output terminals 62, 64 and 66, respectively. These signals may, in turn, be combined in a mixer circuit (not shown) such as 42 in Figure 1, to provide an output pulse, whose duration corresponds to the total time that the multivibrator system is activated in response to a triggering pulse. In the arrangement of Figure 2 it will be seen that the duration of the trigger pulse 68, in order for its delayed version to be used as a stop circuit disabling pulse must be of a duration greater than the timing interval of the multivibrator to which the stopping circuit is applied.

In the arrangement of Figure 2, the stopping circuit 56 is indicated as connected to the multivibrator E through the switch means 72. With such an arrangement, the triggering pulse 68 will trigger the multivibrator C to produce an output pulse 74a shown in Figure 3a. The output pulse 74a will, in turn, trigger multivibrator circuit D, which will in turn produce an output pulse 76a. Output pulse 76a from multivibrator D is in turn applied to the multivibrator E for possible triggering thereof. If the delay line 60 is made to impose a delay on the triggering pulse 68 of approximately the sum of the timing intervals of multivibrators C and D, the delayed triggering pulse 68, acting as a stopping circuit disabling signal, will cause the multivibrator E to respond to the output pulse 76 of multivibrator D. The output pulse from multivibrator E is indicated as 78 in Figure 3c. Pulse 78 will in turn again trigger multivibrator circuit C to produce output pulse 74b. Pulse 74b will, in turn, trigger multivibrator D to produce pulse 76b. If, however, the triggering pulse 68 is of a duration less than the sum of the timing intervals of the multivibrators C, D and E, multivibrator E will be disabled at the termination of the output pulse 76b from multivibrator D. Under such conditions, the triggering pulse 68 will then initiate the generation of five output pulses in the sequence 74a, 76a, 78, 74b and 76b. The stopping circuit 56, of course, may alternatively be applied to multivibrators C or D by means of switch 72. If applied to the multivibrator C, the multivibrator system would produce output pulses in number corresponding to multiples of three. Application of the stopping circuit to multivibrator D will, of course, have an effect similar to that produced by its application of multivibrator E but output pulses will then appear on the basis of one plus multiples of three.

It is further noteworthy that if occasion demands it, the switch means 72 can be effectively operated in accordance with additional electrical control signals (not shown) so that the stopping circuit 56 is alternatively applied to the various multivibrator circuits in accordance with a predetermined sequence or pattern. In this way, the multivibrator system of the present invention may be made to produce pulse trains of varying numbers in response to successive triggering signals.

Further illustrated in the embodiment of the invention in Figure 2 is another feature of the present invention. It will be appreciated that if extreme accuracy in timing of the pulses appearing at the output terminals 62, 64 and 66 is desired, the multivibrator circuits C, D and E, would in accordance with prior art practice have to be extremely stable in operation. However, in accordance with the present invention, stability required of the multivibrators C, D and E may in some instances be quite moderate and their timing accuracy within relatively broad tolerances, wherever there can be found a measure of time which is integrally related to both the pulse duration of each and every pulse produced by the multivibrator system and the recurrence period of the triggering pulses controlling the multivibrator system. Under these conditions extreme accuracy in defining the individual pulses is made possible through the utilization 312, filed October 30, 1953, by Arch C. Luther, Jr., entitled "Monostable Multivibrator" and "Wave Generating Systems," respectively, the diode 143 increases the stability of multivibrator operation by permitting considerable feedback in the cathode circuit of tubes 142 and 144 during conduction periods in which charging of time constant circuit is accomplished. On the other hand, the diode renders the tubes more easily cut off by maintaining the cathodes at ground potential during the cutoff period. An aspect of the arrangement of the multivibrators 142 and 144 is the provision of a stopping tube 152. Stopping tube 152 corresponds to the stopping circuit 30 of Figure 1.

In the operation of the arrangement of Figure 4, stopping tube 152 is arranged to conditionally draw sufficient current to develop across load resistor 153 a negative voltage with respect to circuit ground, of sufficient value to cut off the left hand section of tube 144. Since the left hand section of tube 144 serves to charge the multivibrator time constant circuit 145—146, it follows that the multivibrator based on tube 144 will not respond to cycling of the multivibrator based on tube 142 as long as the left hand section of tube 144 is cut off. If, however, the stopping tube 152 is made less conductive, the bias on the left hand section of tube 144 will be reduced, permitting conduction in the left hand section of tube 144, in response to signal transients. As shown in the previous drawings, the stopping tube 152 is conditionally rendered disabled by means of signal pulses derived from the signal driving source illustrated at 154 in Figure 4. Upon the initiation of triggering pulse 156 it may be assumed that the stopping tube 152 will be rendered non-conducting and will continue so until the charge on the grid leak capacitor of tube 152 has leaked off to a point again permitting the stopping of the multivibrator system.

Since the general operation of Figure 4 is virtually identical to that of the block diagram shown in Figure 1, no detailed description of overall operating principles will be offered. Output pulses will appear at the respective left hand section control electrodes of tubes 142 and 144. Signals from the left hand section control electrodes of tubes 142 and 144 are also applied to a mixer circuit 158 to produce a resultant pulse 160 having a duration 9H. This is applied to the gate circuit 120 to prevent the transmission of horizontal blanking signals or horizontal sync pulses during the 9H. period in which equalizing and vertical serration pulses are to be transmitted. The 3H. pulse train 162, of course, controls the gate circuit 130 which prevents equalizing pulse signals from being transmitted except during the first and last 3H. period of the vertical synchronizing signal. The 3H. pulse 166 from tube 144 effects gating of the television vertical serration pulses.

It will be noted that the function of gate circuit 116, not mentioned above, is merely to prohibit the transmission of horizontal blanking signals during the vertical blanking period. Hence, the gate 116 is made responsive to the vertical blanking signal derived from the vertical blanking generator 104.

In order to maintain the timing intervals of the multivibrators 142 and 144 exactly as illustrated in Figure 3, a 10.5 kc. signal is applied to the cathode circuits of each multivibrator amplifier. The 10.5 kc. signal may be derived from any convenient source which provides a signal synchronously related to the horizontal synchronizing signal to be transmitted.

In the arrangement of Figure 4, the 10.5 kc. signal is derived from a countdown circuit 103 which divides the 31.5 kc. master oscillator signal by a factor of three. The positive excursions of this signal as applied to the left hand sections of tubes 142 and 144 will tend to cause conduction in the right hand sections of these tubes at a time earlier than the normal timing period of the multivibrator. Thus, the 10.5 kc. signal delivered by the countdown circuit 103 corresponds to the timing control pulses 82 of Figure 3, which have hereinabove been fully described.

It is also noted that in accordance with the present invention, should the 9H. pulse 160 be of the incorrect polarity to operate a utilization means such as the gate 120, it is possible to provide a resistor 172 in series with the stabilizing diode 143 of Figure 4. The waveform 174 appearing across the resistor 172 will represent the sum of all signals delivered by the multivibrator, and will consequently, provide a 9H. pulse in the particular embodiment shown in Figure 4.

From the above, it can be seen that the novel features of the present invention, although having application in numerous places in the electronic field, find particular value in connection with the generation of television synchronizing sigal waveforms. It will be appreciated that in cases where it is not desired to time the intervals of the pulse trains developed by circuitry such as is shown in Figure 4, the application of the timing control pulses may be omitted without departing from the scope of the present invention.

What is claimed is:

1. In a multivibrator system the combination of: a first multivibrator having an input trigger circuit and an output circuit; a second multivibrator having an input trigger circuit and an output circuit; signal coupling means connected from said first multivibrator output circuit to said second multivibrator input trigger circuit; signal coupling means connected from said second multivibrator output circuit to said first multivibrator input trigger circuit; means coupled with said first multivibrator input trigger circuit for triggering said first multivibrator with trigger signals; stopping means coupled with one of said multivibrators for normally disabling the multivibrator to which it is coupled; and control means coupled with said triggering means and said last named means for disabling said stopping means in response to trigger signals applied to said first multivibrator input trigger circuit.

2. A multivibrator system, according to claim 1, wherein there is additionally provided means coupled with said first multivibrator input circuit and said triggering means for isolating said control means from signals developed in said second multivibrator output circuit.

3. A multivibrator system, according to claim 1, wherein the triggering signals provided by said triggering means are of a predetermined recurrence frequency and of each a predetermined duration period and wherein there is additionally provided a source of timing control signal whose recurrence period is integrally related to both the recurrence period and the duration period of said triggering signals; and means connected from said source of timing control signal to at least one of said multivibrators for supplementing triggering signals otherwise reaching said last named multivibrator means.

4. In a signal generating system, the combination of: a source of trigger signal; a plurality of monostable multivibrators connected in a chain loop relation to one another whereby to conditionally produce continuous chain triggering of one another; signal coupling means connected from said trigger signal source to said chain loop of multivibrators for triggering thereof; signal responsive disabling means connected with at least one of said plurality of multivibrators for normally disabling said multivibrator except during periods of response to a disabling control signal; means coupled with said trigger signal source to produce a disabling control signal bearing a timed relation to trigger signals; and means coupled with said last named means and said signal responsive disabling means for controlling said disabling means with said disabling control signal.

5. A signal generating system according to claim 4, wherein said trigger signal is recurrent in nature and of a predetermined width period and wherein said control signal producing means comprises a signal delay means designed to impose a signal delay on said trigger signal short enought to permit control of said disabling means during the timing interval of the multivibrator to which said disabling means is connected.

6. In a television synchronizing signal generating system designated to develop a complex television signal including a vertical timing period waveform divisible in time into three consecutive periods each substantially three television lines in duration and commencing substantially at termination of a field of television scansion, the first and third of said periods corresponding to television equalizing pulse periods while the second of said periods corresponds to a television serration signal period, the combination of: a source of double line frequency master timing signal; means developing a primary timing signal bearing a fixed timing relation to said master timing signal and of television field frequency; a first and second monostable multivibrator connected in a closed loop series relation with one another of a nature tending to maintain perpetual triggering of each by the other, each multivibrator having a cycling interval greater than three line intervals; a multivibrator circuit stopping circuit connected with the second of said multivibrators for normally maintaining said second multivibrator in a disabled condition; means responsive to a control signal for conditionally deactivating said last named means; signal coupling means connected from said primary timing signal developing means to said first multivibrator for triggering thereof; means coupled with said primary timing signal developing means for producing a control signal of a duration greater than three television line periods but less than six television line periods and which commences prior to the second of said three line periods following the termination of said field scansion; television equalizing pulse developing means; means coupled with said first multivibrator for controlling said last named means with output signals from said first multivibrator; television serration signal developing means; means coupled with said second multivibrator for controlling said last named means with output signals from said second multivibrator; a signal mixing circuit connected with said first and second multivibrator means for combining the output signals therefrom into a horizontal synchronizing signal control wave; television horizontal synchronizing pulse generating means; means coupled with said last named means for controlling production of the horizontal synchronizing pulses in accordance with signals produced by said mixing circuit; and means for combining said controlled equalizing and said controlled horizontal synchronizing pulses into a composite signal.

7. A television synchronizing signal generating system according to claim 6, wherein there is additionally provided means responsive to said master timing signal source to develop a supplemental timing signal representing a subharmonic of said master timing signal; and means coupled with said multivibrators for triggering said multivibrators on a supplementary basis with said supplemental timing signal.

8. In a multivibrator system, the combination of: a first multivibrator having an input trigger circuit and an output circuit, said multivibrator including at least one electron tube having a cathode element; a second multivibrator having an input trigger circuit and an output circuit, said multivibrator including at least one electron tube having a cathode element, said first and second multivibrators having independent cycling intervals; signal coupling means connected from said first multivibrator output circuit to said second multivibrator input trigger circuit; signal coupling means connected from said second multivibrator output circuit to said first multivibrator input trigger circuit; means coupled with said first multivibrator input trigger circuit for triggering said first multivibrator with trigger signals; resistance means common to said cathodes of said first and second multivibrator tubes to carry current of both of said tubes to develop a signal voltage representing the sum of the cycling intervals of said first and second mutivibrators.

9. In a multivibrator system, the combination of: a plurality of multivibrators connected in closed loop relation with one another to form a ring tending to perpetuate successive cycling of its member multivibrators; means for stopping one of said multivibrators; input signal means coupled with at least one of said multivibrators to deliver triggering signals thereto; and means coupled with said last two named means for interrupting said stopping means stopping influence in response to triggering signals.

10. In a multivibrator system, the combination of: a plurality of multivibrators connected in closed loop relation with one another to form a ring tending to perpetuate successive cycling of its member multivibrators; means for stopping one of said multivibrators; input signal means coupled with at least one of said multivibrators to deliver triggering signals thereto; means coupled with said input signal means for developing a control signal having a fixed time relation to said triggering signals and higher in frequency; and means coupled with said last named means and a plurality of said multivibrators to control each of said multivibrators with said control signal supplementally to the effect of said triggering signals.

11. In a multivibrator system the combination of: a first multivibrator having an input trigger circuit and an output circuit; a second multivibrator having an input trigger circuit and an output circuit; signal coupling means connected from said first multivibrator output circuit to said second multivibrator input trigger circuit; signal coupling means connected from said second multivibrator output circuit to said first multivibrator input trigger circuit; a source of trigger pulses coupled to the input trigger circuit of said first multivibrator, and disabling means having an input coupled to said source of trigger signals and having an output coupled to one of said multivibrators to normally disable said multivibrator, said disabling means being rendered inoperative to disable said multivibrator for a predetermined time following receipt of each of said trigger pulses.

12. In a multivibrator system the combination of: a first multivibrator having an input trigger circuit and an output circuit; a second multivibrator having an input trigger circuit and an output circuit; signal coupling means connected from said first multivibrator output circuit to said second multivibrator input trigger circuit; signal coupling means connected from said second multivibrator output circuit to said first multivibrator input trigger circuit; a source of trigger pulses coupled to the input trigger circuit of said first multivibrator, and disabling means having an input coupled to said source of trigger signals and having an output coupled to one of said multivibrators to normally disable said multivibrator, said disabling means being rendered inoperative to disable said multivibrator for a predetermined time following receipt of each of said trigger pulses, and in addition, a source of synchronizing pulses coupled to said multivibrators.

References Cited in the file of this patent

UNITED STATES PATENTS

| Number | Name | Date |
|---|---|---|
| 2,402,916 | Schroeder | June 25, 1946 |
| 2,516,146 | Prugh | July 25, 1950 |
| 2,534,287 | Marsh | Dec. 19, 1950 |
| 2,542,644 | Edson | Feb. 20, 1951 |
| 2,567,846 | Jacobsen | Sept. 11, 1951 |
| 2,568,918 | Grosdoff | Sept. 25, 1951 |
| 2,594,731 | Connolly | Apr. 29, 1952 |
| 2,620,440 | Baker et al. | Dec. 2, 1952 |
| 2,628,309 | Hughes | Feb. 10, 1953 |
| 2,678,390 | Abelew | May 11, 1954 |